US006663704B2

(12) United States Patent
Spencer et al.

(10) Patent No.: US 6,663,704 B2
(45) Date of Patent: Dec. 16, 2003

(54) PEARLESCENT INKS, WRITING INSTRUMENTS, AND METHODS

(75) Inventors: Jean L. Spencer, Boston, MA (US); Pawel Czubarow, Wellesley, MA (US); Yoojeong Kim, Framingham, MA (US)

(73) Assignee: Berol Corporation, Freeport, IL (US)

( * ) Notice: Subject to any disclaimer, the term of this patent is extended or adjusted under 35 U.S.C. 154(b) by 0 days.

(21) Appl. No.: 09/898,942

(22) Filed: Jul. 3, 2001

(65) Prior Publication Data
US 2002/0096083 A1 Jul. 25, 2002

Related U.S. Application Data

(63) Continuation-in-part of application No. 09/609,811, filed on Jul. 3, 2000, now abandoned.

(51) Int. Cl.$^7$ .......................... C09D 11/00; C09D 11/16
(52) U.S. Cl. ............... 106/31.9; 106/31.86; 106/31.64; 106/31.65; 106/31.75; 106/31.7
(58) Field of Search .................. 106/31.9, 31.86, 106/31.75, 31.65, 31.7, 31.64

(56) References Cited

U.S. PATENT DOCUMENTS

| | | | |
|---|---|---|---|
| 1,629,250 A | 5/1927 | Bittinger | |
| 2,833,736 A | 5/1958 | Glaser | 260/29.6 |
| 2,956,038 A | 10/1960 | Juelss et al. | 260/33.6 |
| 3,087,828 A | 4/1963 | Linton | 106/291 |
| 3,425,779 A | 2/1969 | Fisher et al. | 401/190 |
| 4,552,593 A | 11/1985 | Ostertag | 106/291 |
| 4,623,396 A | 11/1986 | Kimura et al. | 106/291 |
| 4,652,388 A | 3/1987 | Gold | 252/62.54 |
| 4,705,300 A | 11/1987 | Berning et al. | 283/91 |
| 4,705,356 A | 11/1987 | Berning et al. | 350/166 |
| 4,762,875 A | 8/1988 | Gold | 524/248 |
| 4,779,898 A | 10/1988 | Berning et al. | 283/58 |
| 5,091,010 A | 2/1992 | Souma et al. | 106/403 |
| 5,213,618 A | 5/1993 | Souma et al. | 106/403 |
| 5,252,522 A | 10/1993 | Dorbath et al. | 501/19 |
| 5,271,771 A | 12/1993 | Franz et al. | 106/474 |
| 5,364,467 A | 11/1994 | Schmid et al. | 106/404 |
| 5,445,671 A | 8/1995 | Herget et al. | 106/20 R |
| 5,474,603 A | 12/1995 | Miyashita et al. | 106/25 R |
| 5,540,769 A | 7/1996 | Franz et al. | 106/417 |
| 5,556,527 A | 9/1996 | Igarashi et al. | 204/488 |
| 5,565,024 A | 10/1996 | Schraml-Marth | 106/415 |
| 5,569,535 A | 10/1996 | Phillips et al. | 428/403 |
| 5,573,584 A | 11/1996 | Ostertag et al. | 106/417 |
| 5,585,189 A | 12/1996 | Inoue et al. | 428/461 |
| 5,624,076 A | 4/1997 | Miekka et al. | 241/3 |
| 5,624,487 A | 4/1997 | Schmidt et al. | 106/417 |
| 5,626,661 A | 5/1997 | Schmid et al. | 406/415 |
| 5,672,410 A | 9/1997 | Miekka et al. | 428/148 |
| 5,741,355 A | 4/1998 | Yamamoto et al. | 106/417 |
| 5,753,325 A | 5/1998 | McDaniel | 428/34.7 |
| 5,762,694 A | 6/1998 | Yokoi et al. | 106/31.65 |
| 5,785,746 A | 7/1998 | Kito et al. | 106/31.86 |
| 5,873,934 A | 2/1999 | Kunii et al. | 106/417 |
| 5,958,123 A | 9/1999 | De La Fuente | 106/31.69 |
| 6,056,815 A | 5/2000 | Fu | 106/417 |
| 6,083,311 A | 7/2000 | Kanbayashi et al. | 106/31.65 |
| 6,099,629 A | 8/2000 | Morita et al. | 106/31.6 |
| 6,120,590 A | 9/2000 | Miyamoto et al. | 106/31.6 |
| 6,171,381 B1 | 1/2001 | Yoshimura et al. | 106/31.6 |
| 6,241,858 B1 | 6/2001 | Phillips et al. | 204/192.15 |
| 6,306,930 B1 | 10/2001 | Tsujio | 523/161 |
| 6,325,845 B1 | 12/2001 | Kurihara et al. | 106/31.68 |
| 6,423,127 B1 * | 7/2002 | Miyamoto et al. | 106/31.58 |
| 2001/0036980 A1 | 11/2001 | Tsujio | 523/161 |
| 2002/0033117 A1 * | 3/2002 | Inoue et al. | 106/31.68 |

FOREIGN PATENT DOCUMENTS

| | | |
|---|---|---|
| DE | 1 135 117 | 8/1962 |
| DE | 38 25 702 A1 | 1/1990 |
| DE | 41 41 069 A1 | 6/1993 |
| DE | 42 40 366 A1 | 6/1994 |
| EP | 0 600 205 A1 | 6/1994 |
| EP | 633 299 A | 1/1995 |
| EP | 0 686 675 B1 | 12/1995 |
| EP | 761 785 A2 | 3/1997 |
| EP | 0 787 779 A2 | 8/1997 |
| EP | 0 960 911 | 12/1999 |
| EP | 0 558 916 B1 | 4/2000 |
| EP | 1 006 162 A1 | 6/2000 |
| EP | 1 038 931 A1 | 9/2000 |
| EP | 1 045 014 A2 | 10/2000 |
| EP | 1 111 018 A1 | 6/2001 |
| GB | 974123 | 11/1964 |
| GB | 1192920 | 5/1970 |
| JP | 54-19806 | 2/1979 |
| JP | 54-148605 | 11/1979 |
| JP | 56-139571 | 10/1981 |
| JP | 58-17171 | 2/1983 |

(List continued on next page.)

OTHER PUBLICATIONS

Dobrowolski et al., "Optical interference coatings for inhibiting of counterfeiting" *Optica Acta*, 20(12):925–937 (1973), No month available.
Emmert, "Instrumentation Color Matching of Pearlescent Pigments," *Cosmetics & Toiletries*, 104(7) Jul. 1989.
Greenstein, "Nacreous (Pearlescent) Pigments," *Pigment Handbook*, John Wiley & Sons, vol. 1, pp. 871–890 (1973), No month available.
Rona Product Brochure, EM Industries, Inc. Chemicals & Pigments Division (1996) No month available.
International Search Report for PCT/US01/21250 In the name of Berol Corporation, Jan. 2002.
International Preliminary Examination Report dated Aug. 7, 2002, for International Application No. PCT/US01/21250.
Sommer et al., "Metal effect pigments" *Verfksroniek*, 71(11):25–28 (1998), Nov..

Primary Examiner—Mark L. Bell
Assistant Examiner—Veronica F. Faison
(74) Attorney, Agent, or Firm—Marshall, Gerstein & Borun LLP

(57) ABSTRACT

Pearlescent inks are provided. The inks are suitable for use in writing instruments, and include a dispersion of a pearlescent pigment in a solvent. Some inks are erasable and/or shear-thinning.

39 Claims, No Drawings

FOREIGN PATENT DOCUMENTS

| | | |
|---|---|---|
| JP | 60-170676 | 9/1985 |
| JP | 61-106681 | 5/1986 |
| JP | 61-130384 | 6/1986 |
| JP | 62-28834 | 6/1987 |
| JP | 03-027999 | 2/1991 |
| JP | 05-117569 | 5/1993 |
| JP | 05-295048 | 11/1993 |
| JP | 06-299114 | 10/1994 |
| JP | 06-313142 | 11/1994 |
| JP | 07-118592 | 5/1995 |
| JP | 08-010691 | 1/1996 |
| JP | 09-188830 | 7/1997 |
| JP | 09-268270 | 10/1997 |
| JP | 10-067946 | 3/1998 |
| JP | 10-067948 | 3/1998 |
| JP | 10-158540 | 6/1998 |
| JP | 10-158541 | 6/1998 |
| JP | 10-259316 | 9/1998 |
| JP | 10-259317 | 9/1998 |
| JP | 10-279828 | 10/1998 |
| JP | 11-076868 | 3/1999 |
| JP | 11-080629 | 3/1999 |
| JP | 11-130998 | 5/1999 |
| JP | 11-148042 | 6/1999 |
| JP | 11-360187 | 12/1999 |
| JP | 2000-26783 | 1/2000 |
| JP | 2000-002344 | 1/2000 |
| JP | 2000-002370 | 1/2000 |
| JP | 2000-071999 | 3/2000 |
| JP | 2000-072995 | 3/2000 |
| JP | 2000-103997 | 4/2000 |
| JP | 2000-119579 | 4/2000 |
| JP | 2000-282779 | 10/2000 |
| JP | 2000-345096 | 12/2000 |
| JP | 2001-026730 | 1/2001 |
| JP | 2001-72909 | 3/2001 |
| JP | 2001-72995 | 3/2001 |
| JP | 2001-080263 | 3/2001 |
| JP | 2001-081382 | 3/2001 |
| SU | 1654406 A | 6/1991 |
| WO | WO 93/12182 | 6/1993 |
| WO | WO 94/17146 | 8/1994 |
| WO | WO 95/15361 | 6/1995 |
| WO | WO 96/17025 | 6/1996 |
| WO | WO 97/35935 | 10/1997 |
| WO | WO 98/26014 | 6/1998 |
| WO | WO 98/40441 | 9/1998 |

* cited by examiner

PEARLESCENT INKS, WRITING INSTRUMENTS, AND METHODS

This is a continuation-in-part of U.S. patent application Ser. No. 09/609,811, filed Jul. 03, 2000, now abandoned the entire disclosure of which is herein incorporated by reference.

BACKGROUND OF THE INVENTION

1. Field of the Invention

This invention relates to pearlescent inks, writing instrume nts, and methods and, more particularly, to pearlescent inks that are shear-thinning and/or erasable, and can be used in writing instruments.

2. Description of Related Technology

Inks that are used in writing instruments, such as, for example, pens and markers, generally include one or more solvents, such as, water and/or one or more organic solvent (s), and a colorant, typically a dye or pigment. In some inks not used in writing instruments, such as, printing inks for gravure or offset printing, the pigment is a nacreous or pearlescent pigment that imparts an iridescent or "pearlescent" sheen to a marking formed with the ink. Such pearlescent pigments are described in, for example, U.S. Pat. No. 3,087,828, the disclosure of which is incorporated herein by reference.

SUMMARY OF THE INVENTION

This invention provides shear-thinning and/or erasable pearlescent inks that can be used in writing instruments.

In accordance with one aspect of the invention, a pearlescent ink for use in a writing instrument comprises a shear-thinning additive and pearlescent pigment particles dispersed in a solvent.

In accordance with another aspect of the invention, an erasable pearlescent ink comprises a dispersion of a pearlescent pigment in a solvent. The ink exhibits an erasability of at least about 80%.

In accordance with an additional aspect of the invention, a shear-thinning pearlescent ink comprises a pearlescent pigment, a solvent, and, a shear-thinning additive, wherein said pigment is dispersed in said solvent. The ink has a shear thinning index of between about 0.01 and about 0.8.

In accordance with yet another aspect of the invention, a method of forming a marking on a substrate comprises making a marking on the substrate with a writing instrument containing a pearlescent ink. The pearlescent ink comprises a shear-thinning additive and pearlescent pigment particles dispersed in a solvent.

In accordance with an additional aspect of the invention, a method of forming a marking on a substrate comprises making a marking on the substrate with a writing instrument containing a pearlescent ink. The pearlescent ink comprises a dispersion of a pearlescent pigment in a solvent. The ink exhibits an erasability of at least about 80%.

In accordance with another aspect according to the invention, a method of forming a marking on a substrate comprises making a marking on the substrate with a writing instrument containing a pearlescent ink. The pearlescent ink comprises a solvent, a shear-thinning additive, and a pearlescent pigment. The pigment has an average particle diameter between about 2 microns and about 15 microns and is dispersed in the solvent.

In accordance with another aspect according to the invention, a method of forming a marking on a substrate comprises making a marking on the substrate with a writing instrument containing a pearlescent ink. The pearlescent ink comprises a pearlescent pigment, a solvent, and, a shear-thinning additive. The pigment is dispersed in the solvent and the ink has a shear thinning index of between about 0.01 and about 0.8.

In accordance with another aspect according to the invention, a writing instrument comprises a reservoir containing a pearlescent ink. The pearlescent ink comprises a shear-thinning additive and pearlescent pigment particles dispersed in a solvent.

In accordance with another aspect according to the invention, a writing instrument comprises a reservoir containing a pearlescent ink. The pearlescent ink comprises a dispersion of a pearlescent pigment in a solvent, and the ink exhibits an erasability of at least about 80%.

In accordance with another aspect according to the invention, a writing instrument comprises a reservoir containing a pearlescent ink. The pearlescent ink comprises a solvent, a shear-thinning additive, and a pearlescent pigment, and the pigment has an average particle diameter between about 2 microns and about 15 microns and is dispersed in the solvent.

In accordance with another aspect according to the invention, a writing instrument comprises a reservoir containing a pearlescent ink comprising a pearlescent pigment, a solvent, and, a shear-thinning additive. The pigment is dispersed in the solvent and the ink has a shear thinning index of between about 0.01 and about 0.8.

These and other features, aspects, and advantages of the invention will become better understood with regard to the following description and appended claims.

DETAILED DESCRIPTION OF THE PREFERRED EMBODIMENTS

In accordance with the invention, pearlescent inks are disclosed for use in instruments intended for writing on a substrate, such as, for example, pens and markers. The inks of the invention provide good writing properties and an attractive, pearlescent appearance. The pearlescence of the writing composition or ink tends to give markings formed with the ink an appearance of depth.

In one aspect, the invention features a pearlescent ink for use in a writing instrument, including a dispersion of a pearlescent pigment in a solvent.

Implementations of this aspect of the invention may include one or more of the following features. The solvent includes an aqueous solvent system. The ink is shear-thinning. The ink has a shear thinning index of between about 0.01 and about 0.8. The ink has a viscosity greater than 200 mPa·sec at a shear rate of about 1.0 sec$^{-1}$, and a viscosity less than 1000 mPa·sec at shear rates greater than about 100 sec$^{-1}$. The ink is erasable. The ink has an erasability of at least about 90%. The pearlescent pigment has a flake-like morphology. The pearlescent pigment has a radius of gyration of at least about 0.5 micron. The ink is substantially free of dye. The ink further includes a second pearlescent pigment having a color effect that is different from that of the pearlescent pigment. The ink further includes a non-pearlescent pigment. The pearlescent pigment includes a dichromatic pigment. The ink further includes a shear-thinning additive.

In another aspect, the invention features an erasable pearlescent ink including a dispersion of a pearlescent pigment in a solvent, the ink exhibiting an erasability of at least about 80%.

Implementations of this aspect of the invention may include one or more of the following features. The pearlescent pigment consists essentially of particles having a radius of gyration of at least about 0.5 micron. The solvent includes an aqueous solvent system. The ink is shear-thinning. The ink has a shear thinning index of between about 0.01 and about 0.8. The ink exhibits an erasability of at least about 90%. The ink is substantially free of dye. The ink further includes a second pearlescent pigment having a color effect that is the same or different from that of the pearlescent pigment. The ink further includes a non-pearlescent pigment. The pearlescent pigment includes a dichromatic pigment.

In a further aspect, the invention features a shear-thinning pearlescent ink including a dispersion of a pearlescent pigment in a solvent, the ink having a shear thinning index of between about 0.01 and about 0.8.

In yet another aspect, the invention features a pearlescent ink comprising a dispersion of a dichromatic pearlescent pigment in a solvent.

The invention also features methods of marking on substrates using writing instruments containing inks of the invention.

When used in a writing instrument, preferred pearlescent inks exhibit even laydown, good line intensity, good line uniformity, and good writing performance.

As used herein, the term "laydown" refers to the amount of ink that is deposited on a substrate when making a marking of a particular length. Typical laydown for the preferred pearlescent inks is between about 0.1 mg/m and about 15.0 mg/m; preferably, between about 1.0 mg/m and about 12.0 mg/m; and most preferably, between about 5.0 mg/m and about 10.0 mg/m.

As used herein, the term "even laydown" refers to the morphology of the ink when it is applied to a substrate to create a continuous marking and is characterized by minimal skipping (few voids occur within the written line), and uniform thickness (the width of the written line is approximately constant along the length of the line).

As used herein, the term "line intensity" refers to the intensity of a marking made on a substrate such as paper. The intensity of a marking can be measured as the average gray value of the detected tracings (black=0; white=255). The percent intensity of the writing with an average gray value of z is then calculated as: % Intensity=$(1-[z/255])$ multiplied by 100. Alternatively, the intensity of a marking can be determined by calculating the difference between the recorded reflectance of the substrate without any marking ("Blank Reflectance") and the reflectance of the marking on the substrate ("Reflectance of Marking"). According to this method, the percent intensity of a marking is calculated by normalizing the calculated intensity difference to the Blank Reflectance and multiplying this value by 100. A black standard has an intensity of marking equal to 100%. The data obtained from these two methods are comparable.

As used herein, the term "line uniformity" refers to the standard deviation of the line intensity measured along different portions of a marking made on a substrate. Line uniformity can be used as a measure of even laydown.

In some preferred implementations, the inks are erasable from a paper substrate. The erasable, pearlescent inks are erasable by common erasers, such as Pink Pearl erasers (Sanford Corporation, Bellwood, Ill.), and provide good writing performance. For example, the pearlescent inks according to the invention have a line intensity greater than about 25 percent, more preferably greater than about 30 percent, and most preferably greater than about 40 percent.

As used herein, the term "erasability" refers to the ability to recover the gray level reading of the blank paper by removing the written tracings with an eraser. The percent erasability can be calculated as: % Erasability=$(z/z_o)$ multiplied by 100 where z is the average gray value of the erased section and $z_o$ is the average gray value of the blank section of paper.

The erasability of the shear-thinning inks can also be evaluated by manual erasure and visual observation, but this involves personal factors such as applied pressure and size of surface being erased. An alternative, more accurate evaluation can be conducted by applying the trace to the substrate via a standard writing test method in which the paper is advanced beneath a writing instrument at a rate of 245 mm per minute. The paper is removed and placed on an erasing instrument including an erasing head provided with a Sanford (Bellwood, Ill.) Pink Pearl pencil eraser #101 (Shore A34 hardness, ASTM D 2240). The erasing head is applied under a load of 380 grams to the paper bearing the trace. The eraser has a surface measuring 7 mm by 3 mm. The erasing head reciprocates at a rate of 75 cycles per minute, the length of each stroke being 50 mm. Each trace is subjected to 25 cycles of erasing which can be visually observed or rated by photometer readings. Once a trace has been applied to the substrate with the writing instrument, the applied trace is left to air dry at room temperature for about five minutes prior to erasing the trace with the erasing head. The photometer readings can be recorded on a reflectometer such as a MacBeth PCM II reflectometer. According to this method, the erasability can be determined by recording the reflectance of each erased line ("Reflectance of Erased Line") and the reflectance of the paper without any marking ("Blank Reflectance") and calculating the ratio of Reflectance of Erased Line to Blank Reflectance, i.e., $E_{tot}$=(Erased Line/Blank). The percent erasability is then calculated by multiplying $E_{tot}$ by 100. The data obtained from these two methods are comparable.

The pearlescent inks of the invention typically exhibit an erasability of at least about 70 percent, preferably greater than about 80 percent, more preferably greater than about 90 percent, and most preferably greater than about 95 percent.

Some preferred inks are also shear-thinning. Such shear-thinning pearlescent inks in accordance with the invention are non-Newtonian liquids that exhibit shear-thinning flow behavior when subjected to shear. The most preferred inks according to the invention become thin, readily flowable liquids having a viscosity of no greater than about 1000 mPa·sec at shear rates greater than about 100 $sec^{-1}$. Typically, the pearlescent pigment containing writing composition has a viscosity between 200 mPa·sec and 20,000 mPa·sec at a shear rate of about 1.0 $sec^{-1}$, and a viscosity between 10 mpa·sec and 1000 mPa·sec at a shear rate of about 100 $sec^{-1}$. The erasable, shear-thinning, pearlescent inks of this invention generally include at least one water dispersible, shear-thinning additive dispersed in an aqueous solvent system.

Preferred pearlescent inks are erasable from a paper substrate, and are shear-thinning. Preferred erasable, shear-thinning pearlescent inks include a shear-thinning additive and a pearlescent pigment, both dispersed in an aqueous solvent system. Typically, the inks include from about 0.01 weight percent to about 10 weight percent of the shear-thinning additive, from about 1 weight percent to about 50 weight percent of the pearlescent pigment, and from about 30 weight percent to about 99 weight percent of the aqueous solvent system. Preferably, the inks include from about 0.05 weight percent to about 5 weight percent shear-thinning additive, from about 3 weight percent to about 25 weight percent pearlescent pigment, and from about 60 weight percent to about 96 weight percent aqueous solvent system. More preferably, the ink includes from about 0.1 weight percent to about 2 weight percent shear-thinning additive, from about 5 weight percent to about 20 weight percent pearlescent pigment, and from about 74 weight percent to about 94 weight percent aqueous solvent system.

Pearlescent Pigment Particles:

Suitable pearlescent particles are dispersible in a desired solvent or carrier and provide a desired color and special pearlescent-type effects such as depth, luster, iridescence, metallic sheen, and multiple-color play. Further, the pearlescent pigment remains suspended in the writing composition during storage, minimizing or even eliminating the need to mix or agitate the writing composition prior to writing. Pearlescent pigments, often referred to as effect pigments or nacreous pigments, include natural pearl essence (guanine/hypoxanthine crystals from fish scales), basic lead carbonate, lead hydrogen arsenate, bismuth oxychloride, and mica flakes coated with metal oxides and, in some cases, other colorants. Additionally, some pearlescent pigments may further include silica.

A suitable mica phase for use in the metal-oxide covered mica pearlescent pigments in accordance with the invention is Illite (JCPDS card # 26-0911). Suitable metal oxides include titanium dioxide, chromium oxide, cobalt oxide, nickel oxide, tin oxide and iron oxide. A suitable iron oxide is hematite. Substrates other than mica can also be used to generate pearlescent pigments exhibiting desirable effects. These materials include lamellar forms of talc, bismuth oxychloride, iron oxides, silicon dioxides, glass, graphite and various synthetic micas.

Pearlescent pigments in accordance with the invention are commercially available. Preferred pearlescent pigments include products sold under the trade names Afflair (EM Industries, Inc., Hawthorne, N.Y.); Timiron, Colorona, Soloron, Dichrona, and Biron (the Rona division of EM Industries, Inc., Hawthorne, N.Y.); Mearlin, Cellini, Timica, Duocrome, and Mearlite (Engelhard Corporation, Iselin, N.J.); Flonac (Presperse, Inc., Piscataway, N.J.); and Firemax (Rocky Mountain International, Denver, Colo.).

The structures of the mica-based pearlescent pigments in accordance with the invention are complex, and allow for the production of colors by interference, transmission, and absorption of light. The observed optical properties can be controlled by changing the particle size of the mica and by varying the chemical composition, crystallinity, and thickness of the oxide coating. Large mica particles produce glittery, high-luster pigments, while small mica particles (less than 15 microns in diameter) produce satiny, low-luster pigments. However, the actual color of the pearlescent pigment is controlled by the oxide layer, and variations in this layer determine whether the pearlescent is classified as an interference, metallic, or combination pigment.

Interference pearlescent pigments typically have a layer of titanium dioxide ($TiO_2$) deposited on the mica surface. Interference of light that is reflected from the top and the bottom of the oxide layer produces a color at the specular angle or mirror angle, also referred to as the spectral angle. This color depends on the thickness of the layer, progressing through silver (40–60 nm), yellow (60–80 nm), red (80–100 nm), blue (100–130 nm), and green (130–160 nm) as the thickness increases. Light transmitted through the pigment also has a color, but this color is complementary to the interference color. When the pigment is observed, the color is angle dependent, with a transmitted color reflected diffusely back and visible at all angles and an interference color seen only at the specular angle. The transmitted color is absorbed when the interference pigment is placed on a black background or mixed with a black pigment, such that the interference color effect dominates.

Metallic pearlescent pigments can be made when iron oxide ($Fe_2O_3$) is deposited on the mica surface. In this case, color results from light absorption by the iron oxide and light interference from the oxide layer. Color progresses from bronze, copper, and russet as the thickness of the layer increases.

Other suitable pearlescent pigments, referred to as combination pigments, are created by precipitating other pigments or dyes on top of or simultaneously with the original oxide layer. Examples of these materials include iron oxide ($Fe_2O_3$ or $Fe_3O_4$), chromic oxide ($Cr_2O_3$), cobalt titanate ($CoTiO_3$), aluminum oxide, silica, ferric ferrocyanide, iron blue, carmine, and D&C Red 30. Combination pigments produce colors which are a mixture of both interference and absorption effects. When the absorption color (arising from the mass tone of the inorganic or organic colorant) is the same as the interference color, the resulting pearlescent pigment has a rich, brilliant color. When the absorption color is different from the interference color, the resulting pigment has a dual-color, or two-tone, effect. In this situation, the color observed varies according to the viewing angle, with the interference color being seen at the specular angle and the absorption color being seen at all other angles. These pigments are referred to as "dichromatic pigments." Such pigments are commercially available from the Rona division of EM Industries under the tradenames Dichrona and Colorona.

The morphology of the pearlescent pigment is selected to provide good erasability and writing properties. The pigment morphology can be defined by the radius of gyration of the pigment particles, i.e., the radius of an imaginary sphere that is defined by rotating a sheet-like particle about its center of gravity. Preferably, the pigment particles have a radius of gyration of from about 0.5 micron to about 12.5 microns, more preferably about 1.0 micron to about 7.5 microns. The dimensions of the pearlescent pigment particles can also be described by an aspect ratio of the average particle length to the average particle width. The average length and average width can be the same or different. Typically, the average width of the pearlescent particles is less than the average length. The aspect ratio is typically between about 1 and about 12, preferably between about 1 and about 7, more preferably between about 1 and about 3, and, most preferably, between about 1 and about 2.

The average dimensions of the pearlescent pigment particles can be ascertained by performing scanning electron microscopy (SEM). Preferably, the pearlescent pigment particles have an average thickness less than about 1 micron; more preferably, the average thickness is less than about 0.5 micron; and most preferably, the average thickness is less than about 0.25 micron. Preferably, the pearlescent pigment particles have an average particle diameter between about 1 micron and 25 microns; more preferably, the average particle diameter is between about 2 microns and about 15 microns; and, most preferably, the average particle diameter is between about 3 microns and about 12 microns.

Furthermore, typically more than 75 percent of the pearlescent pigment particles have a diameter between 2 micron and 20 microns; more preferably, more than 85 percent of the pearlescent pigment particles are between 2 micron and 20 microns; most preferably, more than 90 percent of the pearlescent pigment particles are between 2 micron and 20 microns.

In general, the dimensions of the pearlescent pigment particles are selected to allow the particles to pass through point openings in conventional writing instruments and to limit penetration of the particles into the interstices of the substrate material. The flake-like morphology of the pearlescent pigment causes the pigment particles to self-assemble, i.e., to lie flat on the surface of the substrate material without penetrating into the interstices of the substrate. Self-assembled particles on the surface of the substrate are easily erased, whereas highly structured particles, e.g., dendritic carbon blacks, or very small particles, tend to interlock in the interstices and thus generally are not easily erased.

Two or more pearlescent pigments of different or the same colors can be mixed to obtain desired color effects. If the pigments derive color from interference alone, then the colors mix additively, e.g., blue and yellow does not yield green, but instead yields white or a lighter blue or yellow, depending on the ratio of blue to yellow pigment. Thus, if a blue interference pigment is a more intense blue than desired, a yellow interference pigment can be added to adjust the color. Combining a blue interference pigment with a second blue pigment that derives color from both interference and absorption can result in a mixture that is brilliant blue.

Other Colorants:

Pearlescent pigments can also be mixed with non-pearlescent pigments. To maintain the erasability of the writing composition, the non-pearlescent pigment should have a flake-like morphology within the particle size distribution of the pearlescent pigment. Examples of acceptable non-pearlescent pigments include graphite flakes, aluminum flakes, and black mica flakes (mica coated with black iron oxide and titanium dioxide). Typically, the concentration of flake-like non-pearlescent pigments in the pearlescent writing composition is about 0.1 percent by weight to 20 percent by weight, more preferably about 0.5 percent by weight to 15 percent by weight, and most preferably about 1 percent by weight to 10 percent by weight. The preferred ratio of flake-like non-pearlescent pigments to pearlescent pigments in the writing composition is between about 1:1 and about 1:30.

Other colorants, such as dyes and non-flake-like pigments, are not suitable for an erasable pearlescent writing composition. Such colorants tend to either stain the paper substrate in the case of dyes or become entrapped by the paper substrate in the case of non-flake-like pigments. Both interactions have a negative effect on erasability. The only exception might be a non-flake-like pigment that has the same color as the substrate color. In general, preferred writing compositions contain less than about 0.1 percent by weight of dyes and non-flake-like pigments, and most preferred writing compositions contain none of these colorants.

When mixing a pearlescent pigment with a non-pearlescent pigment, the resulting color is usually determined empirically. However, if the non-pearlescent pigment is black (for example, graphite or black mica), the color results can be predicted.

For example, if the pearlescent pigment is a violet interference pigment which is mixed with the black, the color is perceived as becoming more intensely violet as the black absorbs scattered light. (See, for example, Examples 1A and 1B in Table 2 in the Examples section below.) If the pearlescent pigment is a two-tone pigment which is mixed with the black, the color is perceived as changing from a two-tone effect (with the absorption pigment the predominant color) to a color dominated by the inteference color as the black absorbs the scattered light from the absorption pigment. For a red/blue pearlescent pigment (carmine with a titanium dioxide layer), the perceived color changes from a purplish pink to an intense bluish purple as the black is added. (See, for example, Examples 2A and 2B in Table 2, below.) Similarly, if the pearlescent pigment has an oxide layer that produces both an inteference color and an absorption color, addition of a black pigment causes the mixture to change to a color dominated by the interference color. Addition of black to a red pearlescent pigment (red iron oxide layer) is perceived as changing color from brownish red to reddish purple. (See, for example, Examples 3A and 3B in Table 2 below.)

As used herein, the terms "non-pearlescent pigments" and "non-pearlescent pigment particles" are meant to encompass those materials that do not provide a pearlescent appearance to a written marking when used without a pearlescent pigment in accordance with the invention.

Lubricious Particles:

Pearlescent pigments can also be mixed with lubricious particles to enhance the flow of the composition through the small channels encountered in the point of the writing instrument. Because the pearlescent pigments are plate-like, they can stack on top of one another to form irregular piles when the flow is too slow or too constrictive. When these platelet stacks contact another platelet, another platelet stack, or irregular surfaces in general, the platelet stacks can catch and are often trapped within the writing instrument, impeding ink flow, or in the worst case, preventing ink flow. When this platelet stacking interaction occurs, the writing composition feels gritty to the user, and the writing performance is neither smooth nor consistent. The addition of lubricious particles provides a smooth and slippery surface for the pearlescent particles to contact and slide over, helping them to get around other particles and surfaces. The lubricious particles can also, by the nature of their size, shape, or material, disrupt the stacking pattern of the platelets. The overall result is a writing composition which feels very smooth. In addition, the lubricious particles can minimize wear on the inside of the point.

Preferred lubricious particles include, but are not limited to, polymeric particles made of polytetrafluoroethylene, polyethylene, polypropylene, polymethylmethacrylate, nylon, modified polyethylene, modified polyamide, and various blends of these materials. The particles are commercially available as micronized or spherical powders, either dry or dispersed in water. If too many lubricious particles are added to a pearlescent writing composition, the color intensity becomes dull; if too few particles are added, the writing performance remains unaffected. Typically, the pearlescent writing compositions include about 0.1 percent by weight to about 20 percent by weight of lubricious particles; preferably, the pearlescent writing compositions include between about 0.5 percent by weight and about 15 percent by weight of lubricious particles; and most preferably, the pearlescent writing compositions include between about 1 percent by weight and about 10 percent by weight of lubricious particles.

The lubricious particles are available with an average particle diameter between about 0.1 micron and about 30 microns. In general, the average particle size should not be any larger than the average particle size of the pearlescent pigment. The preferred average particle diameter for the lubricious particles is less than about 15 microns, and the most preferred average diameter is less than about 10 microns. Because these particles are the same color as the paper substrate (white or off-white in color), they can remain on or in the paper (particularly, the submicron ones), without detrimentally affecting the erasability of the writing composition.

Lubricious particles in accordance with the invention are commercially available. Preferred lubricious particles include products sold under the trade names Microslip, Micropoly, Microsilk, and Ganzpearl (Presperse, Inc., Piscataway, N.J.); Fluoropure, Fluorotouch, Hydropure, and Nanoflon (Shamrock Technologies, Inc., Dayton, N.J.); and Polymist (Ausimont USA, Inc., Thorofare, N.J.).

Less preferred lubricious particles include mineral powders such as graphite. If these mineral powder particles are dark, as in the case of graphite, they will alter the color of the writing composition, and will negatively affect the erasability unless they are plate-like particles within the same approximate size range as the pearlescent pigment. For example, pearlescent ink formulations including flake graphite having the right size distribution will maintain the erasability of the writing composition and will feel smoother. However, the smoothness of the writing composition will be further enhanced if additional lubricious polymeric particles are added to the formulation.

Shear-thinning Additives:

Suitable shear-thinning additives are miscible or dispersible in the aqueous solvent along with the dispersed pearlescent pigment particles, and provide an erasable, shear-thinning pearlescent ink having a shear-thinning index (n) of between about 0.01 and about 0.8, preferably between about 0.05 and about 0.60, and most preferably between about 0.1 and about 0.3. The shear-thinning index (n) is determined by fitting the shear stress ($\tau$) and shear rate ($\gamma$) values obtained from rheological measurements to the empirical power law equation: $\tau = K\gamma^n$ wherein the coefficient (K) is a constant. The exact value of K depends on the composition being tested. The shear-thinning index is also described in U.S. Pat. No. 4,671,691, the disclosure of which is incorporated herein by reference. Shear stress values are measured continuously from 0.5 sec$^{-1}$ to 1000 sec$^{-1}$ and are fit to the power law model to determine the shear-thinning index. Shear-thinning measurements can be performed on a rheometer, such as a Carri-Med Rheometer CSL$^2$-500, available from TA Instruments, located in New Castle, Del.

Suitable shear-thinning additives provide erasable, shear-thinning pearlescent inks which are thickened viscous liquids at rest or at low shear rates. In general, the viscosity decreases as the shear rate increases. Typically, erasable, shear-thinning pearlescent inks have a viscosity between 200 mPa·sec and 20,000 mPa·sec at a shear rate of about 1.0 sec$^{-1}$; preferably, the shear-thinning pearlescent inks have a viscosity between 1000 mPa·sec and 18,000 mPa·sec at a shear rate of about 1.0 sec$^{-1}$; and, most preferably, the shear-thinning pearlescent inks have a viscosity between 2000 mPa·sec and 15,000 mPa·sec at a shear rate of about 1.0 sec$^{-1}$. Typically, erasable, shear-thinning pearlescent inks have a viscosity between 10 mPa·sec and 1000 mPa·sec at a shear rate of about 100 sec$^{-1}$; preferably, the shear-thinning pearlescent inks have a viscosity between 30 mPa·sec and 700 mPa·sec at a shear rate of about 100 sec$^{-1}$; and, most preferably, the shear-thinning pearlescent inks have a viscosity between 50 mPa·sec and 500 mPa·sec at a shear rate of about 100 sec$^{-1}$. As a result, the shear-thinning additives provide an erasable, shear-thinning pearlescent ink having a shear-thinning index (n) between about 0.01 and about 0.8, a viscosity greater than 200 mPa·sec at a shear rate of about 1.0 sec$^{-1}$, and a viscosity less than about 1000 mPa·sec at shear rates above 100 sec$^{-1}$.

Suitable shear-thinning additives do not interact to any significant extent with the substrate materials, e.g., paper, on which the erasable, shear-thinning pearlescent ink is used, in a manner that would deleteriously affect erasability. Suitable shear-thinning additives include, but are not limited to, clays, such as smectites (bentonite and hectorite), and to organoclays, typically smectites modified with long-chain organic cation groups. The term "smectite" refers to a family of non-metallic clays that are primarily composed of hydrated sodium calcium aluminum silicate, including bentonite and hectorite. Common names for smectites include montmorillonite or sodium montmorillonite ("sodium bentonite" or "Wyoming bentonite") and swelling bentonite ("Western bentonite"). Bentonite is a native, colloidal, hydrated, non-metallic mineral of the dioctahedral smectite group, is primarily composed of the mineral montmorillonite, and has been processed to remove grit and non-swellable ore components. Hectorite is a native, colloidal mineral of the trioctahedral smectite group and is primarily composed of sodium magnesium lithium silicate. Typically, hectorite is processed to remove grit and impurities. Clays, such as Bentone MA, and organoclays, such as Bentone 34, are available from Rheox Inc., Hightstown, N.J.

Other suitable shear-thinning additives include water-dispersible gums or resins which can be either natural or synthetic. Natural gums include seaweed extracts, plant exudates, seed or root gums and microbiologically fermented gums. Synthetic gums, such as modified versions of cellulose or starch, include propylene glycol alginate, carboxymethyl locust bean gum and carboxymethyl guar. Many water-dispersible gums can also be described as polysaccharides, because their structure consists of repeating sugar units. Examples of water-dispersible gums include, but are not limited to, xanthan gum (Keltrol and Kelzan made by Kelco Biopolymers, San Diego, Calif.), carboxymethylcellulose (sold as a sodium salt, Blanose, by Hercules Incorporated, Wilmington, Del.), hydroxyethyl cellulose (Natrosol, manufactured by Hercules; Cellosize, by Union Carbide Corporation, Danbury, Conn.), sodium alginate and other salts of alginic acid, kappa, iota and lambda carrageenan (sulfated polysaccharides extracted from red seaweed), gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives (Jagar, manufactured by Rhodia, Inc., Cranbury, N.J.), locust bean gum (a branched galactomannan), tamarind gum, psyllium seed gum, quince seed gum, larch gum, pectin and its derivatives, dextran, hydroxypropylcellulose (Klucel, manufactured by Hercules), cellulose ethers (Methocel, manufactured by Dow Chemical Company, Midland, Mich.) and other water-soluble gums of this type.

Other suitable shear-thinning additives include high molecular weight homo- and copolymers of acrylic acid crosslinked with polyalkenyl polyether sold by BFGoodrich, Charlotte, N.C., under the tradename Carbopol, e.g., Carbopol 934, 940, and 941. Carbopol homopolymers are polymers of acrylic acid crosslinked with allyl sucrose or allylpentaerythritol, and Carbopol copolymers are polymers of acrylic acid modified by long-chain (C10–C30) alkyl acrylates and crosslinked with allylpentaerythritol. Carbopol polymers, also called Carbomers, typically have high molecular weights between about 350,000 and about 5,000,000.

Aqueous Solvent System:

The aqueous solvent system of the pearlescent ink is a polar solvent system in which water is the primary solvent. The aqueous solvent system can consist of water alone, but other water-soluble organic solvents which are useful in inhibiting drying in the point of the writing instrument and in preventing the pearlescent ink from freezing at low temperatures can be included in the aqueous solvent system. Typically, the pearlescent ink includes from 1 percent by weight to 40 percent by weight of a water-soluble organic solvent. Preferably, the pearlescent ink includes 5 percent by weight to 30 percent by weight of a water-soluble organic solvent. Most preferably, the pearlescent ink includes about 8 percent by weight to 25 percent by weight of a water-soluble organic solvent. If too much water-soluble organic solvent is added to the pearlescent ink, the written marks take longer to dry, have worse erasability, exhibit poorer writing characteristics (uneven line intensity), and the solubility of the shear-thinning agent in the formulation may be affected.

The aqueous solvent system can be described in terms of the ratio of water to water-soluble organic solvent. For example, the polar solvent system can be a 1:1 mixture of water and a water-soluble organic solvent. Typically, the ratio of water to water-soluble organic solvent is from about 0.5 part to about 25 parts water per part of organic solvent(s). Preferably, the ratio of water to water-soluble organic solvent is from about 1 part to about 20 parts water per part of organic solvent(s). Most preferably, the ratio of water to water-soluble organic solvent is from about 2 parts to about 10 parts water per part of organic solvent(s). In general, preferred ratios of water to water-soluble organic solvents lead to better erasability and writing characteristics such as even laydown and line intensity.

Examples of water-soluble organic solvents include, but are not limited to, glycols, polyhydric alcohols, glycol ethers, glycol ether esters, amines, amides, and alkanolamides. Other examples of water-soluble organic solvents can be found in McCutcheon's Volume 2: Functional Materials, North American Edition; McCutcheon's Division, The Manufacturing Confectioner Publishing Co., Glen Rock, N.J. (1998), the disclosure of which is herein incorporated by reference. Examples of glycols include, but are not limited to, ethylene glycol, diethylene glycol, propylene glycol, triethylene glycol, polyethylene glycol, and polypropylene glycol. Examples of polyhydric alcohols include, but are not limited to, sorbitol, glycerol, diglycerol, and triglycerol. Examples of glycol ethers include, but are not limited to, ethylene glycol monophenyl ether, diethylene glycol monomethyl ether, propylene glycol monomethyl ether, and dipropylene glycol monomethyl ether. An example of a suitable glycol ether ester is, but is not limited to, propylene glycol monomethyl ether acetate. Examples of amines include, but are not limited to, ethanolamine, diethanolamine, and triethanolamine. Examples of amides include, but are not limited to, urea and thiourea. Examples of alkanolamides include, but are not limited to, Acetamide MEA (Witco Corporation, Greenwich, Conn.) and Schercomid AME-70 (Scher Chemicals, Inc., Clifton, N.J.).

Dispersants:

Additionally, the density and the size of the pearlescent pigment and other pigment particles in the writing composition necessitate the use of one or more effective dispersants to disperse the particles into the pearlescent ink. Typically, such dispersants are water-soluble polymers that include polymeric chains having "anchoring groups" which may or may not carry a charge, and which are attracted to the pearlescent pigment and/or pigment particulate surface. When the unbound portion of the polymeric chain is well solvated, it helps to stabilize the dispersion of particles in the solvent system. Dispersants are also used to reduce the drying times of the erasable, shear-thinning composition. Typically, the pearlescent ink includes about 0.01 percent by weight to about 5 percent by weight of one or more suitable dispersants; preferably, the pearlescent ink includes between about 0.02 percent by weight and about 4 percent by weight of one or more dispersants; and most preferably, the pearlescent ink includes between about 0.05 percent by weight and about 2 percent by weight of one or more dispersants. Compositions not containing sufficient amounts of one or more dispersants may show poor writing performance (reduced or no flow from the point), and may exhibit poor stability with time and/or elevated temperature.

Examples of suitable dispersants include, but are not limited to, nonionic copolymers such as Disperbyk-192 (BYK-Chemie USA, Wallingford, Conn.), anionic copolymers such as Disperbyk-190 and Disperbyk-191 (BYK-Chemie USA, Wallingford, Conn.), anionic phosphated alkoxylated polymers such as Solsperse 40000 and Solsperse 41090 (Avecia Pigments & Additives, Charlotte, N.C.), anionic dimethicone copolyol phosphates such as Pecosil PS-100 and Pecosil PS-150 (Phoenix Chemical, Inc., Somerville, N.J.) and other polymers such as Zephrym PD2434, Zephrym PD2630, Zephrym PD2678, and Zephrym PD3076, available from Uniquema, Wilmington, Del.

Wetting Agents:

In order to produce a consistent written line, the formulation must readily wet the ball of the writing instrument. Furthermore, the formulation must also wet the paper so that written marks dry fast by absorption of the solvent into the paper. Preferred wetting agents can be either anionic or nonionic. Typically, the pearlescent ink includes about 0.01 percent by weight to about 5 percent by weight of one or more suitable wetting agents; preferably, the pearlescent ink includes between about 0.02 percent by weight and about 4 percent by weight of one or more wetting agents; and most preferably, between about 0.05 percent by weight and about 2 percent by weight of one or more wetting agents.

Examples of suitable wetting agents include, but are not limited to, anionic phosphate esters such as Ethfac 324 and Ethfac 361 (Ethox Chemical, LLC, Greenville, S.C.), anionic sulfosuccinates such as Emcol 4100M (Witco Corporation, Greenwich, Conn.) and Triton GR-5M (Union Carbide Corporation, Danbury, Conn.), nonionic ethoxylated fatty acids such as Emerest 2634 and Emerest 2646 (Cognis Corporation, Cincinnati, Ohio), nonionic ethoxylated alcohols such as Brij 58, Brij 98, Renex 20, Renex 36 and Synthrapol KB (Uniquema, Wilmington, Del.), and nonionic polyether-modified polydimethylsiloxanes such as BYK-345, BYK-348, BYK-307 and BYK-333 (BYK-Chemie USA, Wallingford, Conn.).

Preservatives:

Shear-thinning pearlescent inks thickened with polysaccharide gums require the use of one or more preservatives to prevent the growth of bacteria and fungi. The preferred agent is a broad-spectrum biocide, 1,2,-benzisothiazolin-3-one, sold as a solution or dispersion under the tradename Proxel. Examples of suitable preservatives include, but are not limited to, Proxel GXL, Proxel BD20, and Proxel XL2 (Avecia Biocides, Wilmington, Del.) Typically, the shear-thinning pearlescent inks according to the invention can include 0.01 percent by weight to 0.05 percent by weight of the active ingredient in the preservative product. Other preservatives include, but are not limited to, potassium sorbate, sodium benzoate, pentachlorophenyl sodium, and sodium dihydroacetate.

Film-forming Agents:

A small amount of film-forming agent can be added if smudging of the written material is a concern. Smudging tends to increase with increasing laydown and with increasing particle size. However, as the concentration of film-forming agent increases, the erasability of the writing composition decreases. Eventually, enough film-forming agent can be added to the writing composition to make it non-erasable. Examples of suitable film-forming agents for use in the writing compositions according to the invention include, but are not limited to, acrylic copolymers such as Avalure AC 120 and Avalure 122, and polyurethane dispersions, such as Avalure UR 425 and Avalure 450, all of which are available from BF Goodrich Performance Materials, Cleveland, Ohio.

Other Additives:

The shear-thinning pearlescent inks according to the invention can also include other additives that are well-known in the art, such as defoamers, corrosion inhibitors, and lubricants.

Additionally, the pH of the composition can be adjusted to increase the stability and writing characteristics of the writing composition. For example, the stability of erasable, shear-thinning pearlescent inks may be enhanced by adjusting the pH of the composition to between about 5 and about 9, e.g., by adding an acid or a base. More preferably, the pH of the pearlescent pigment writing composition is between about 7 and about 9 and, most preferably, the pH of the pearlescent pigment writing composition is between about 7 and about 8.

Writing Instruments:

Suitable writing instruments to deliver the erasable, shear-thinning compositions include, but are not limited to, conventional ballpoint pens. The tip of a ballpoint pen suitable for use with compositions according to the invention has a ball having a diameter between 0.3 mm and 2.0 mm. The ball is in direct contact with a fluid reservoir containing the writing composition. The clearance between the point opening and the ball must be of sufficient size to allow the pearlescent pigment particles of the erasable, shear-thinning pearlescent inks according to the invention to pass through the point. Preferably, the clearance is at least about 100 microns; more preferably, at least about 25 microns. The ball is made from a group of materials which includes sintered hard alloys, ceramics, and resins. The point material is selected from materials including stainless steel, nickel silver, brass, and molded resins. The point can also contain a spring which contacts the ball and presses it against the inner edge of the front of the point until the force of writing pushes the ball back. Such ballpoint pens having a spring are described in U.S. Pat. No. 5,929,135, the entire disclosure of which is herein incorporated by reference. Other examples of ballpoint pens (without springs) which may be used with the writing composition are the PaperMate Gel Stick pen (Sanford, Bellwood, Ill.) and the uni-ball Signo gel ink pen (Mitsubishi Pencil Co., Ltd., Japan).

The invention can be better understood in light of the following examples which are intended as an illustration of the practice of the invention and are not meant to limit the scope of the invention in any way.

EXAMPLE 1

Pearlescent Ink Formulations

Pearlescent pigment inks were made with a base containing the components given in Table 1. Other components can also be used for this base mixture.

TABLE 1

| Base Mixture for Pearlescent Pigment Inks | |
| --- | --- |
| Component | Wt % |
| Propylene glycol[a] | 18 |
| Keltrol CG (xanthan gum)[b] | 0.7–0.8 |
| Ethfac 361[c] | 0.6 |
| Zephrym PD 2678[d] | 0.6 |

TABLE 1-continued

| Base Mixture for Pearlescent Pigment Inks | |
| --- | --- |
| Component | Wt % |
| Surfynol DF110D[e] | 0.6 |
| Plantaren 1200 N[f] | 0.2 |
| Water | |

[a]Fisher Scientific Company (Pittsburgh, Pennsylvania)
[b]Kelco Industrial Biopolymers (San Diego, California)
[c]Ethox Chemicals, LLC (Greenville, South Carolina)
[d]Uniquema (Wilmington, Delaware)
[e]Air Products and Chemicals, Inc. (Allentown, Pennsylvania)
[f]Cognis Corporation (Cincinnati, Ohio)

TABLE 2

| Pearlescent Pigment Inks[g] | | |
| --- | --- | --- |
| Example | Component 1[h] | Component 2[h] |
| 1A | 10% Afflair 9223 WR II Rutile Fine Lilac | 1% Black Mica |
| 1B | 10% Afflair 9223 WR II Rutile Fine Lilac | 10% Black Mica |
| 2A | 10% Dichrona RB | — |
| 2B | 10% Dichrona RB | 10% Black Mica |
| 3A | 10% Afflair 9525 WR II Red-Violet Satin | — |
| 3B | 10% Afflair 9525 WR II Red-Violet Satin | 10% Black Mica |

[g]All pigments from EM Industries, Inc. (Hawthorne, New York) and Rona business unit of EM Industries.
[h]Weight % pigment added to base mixture in Table 1.

A 38-micron (0.0015-inch) wet film was automatically laid down across a sheet of 60-lb paper using a Byk-Gardner drawdown machine (BYK-Gardner USA, Columbia, Md.). After drying, the color of each ink was observed, as follows:

TABLE 3

| Color Values for Pearlescent Pigment Inks[1] | |
| --- | --- |
| Example | Observed Color |
| 1A | Very light purple |
| 1B | Dark purple |
| 2A | Purplish pink |
| 2B | Bluish purple |
| 3A | Brownish red |
| 3B | Reddish purple |

EXAMPLE 2

Additional Formulations for Shear-Thinning Pearlescent Inks

Samples were formulated in small quantities of 15–30 mL according to the component weight percentages listed in Table 4. The mixing procedure was performed by first combining all ingredients except the propylene glycol, xanthan gum and 2 mL of the total water in a 50 mL polypropylene centrifuge tube. The tube was capped and was manually shaken. The tube was then horizontally attached to a Vortex-Genie 2 mixer (Fisher Scientific Company, Pittsburgh, Pa.) for five minutes of high-speed vortexing. The propylene glycol and xanthan gum were combined in a second tube. The second tube was manually shaken to ensure that the xanthan gum was dispersed in the propylene glycol. After five minutes of high-speed vortexing, the contents of the first tube were added to the second tube. The remaining 2 mL of water was added to the first tube, which was recapped and shaken well. This rinse water of the first tube was then added to the second tube. The second tube was capped, shaken by hand, and then attached horizontally to the mixer apparatus. For a 15 mL sample, the tube was first vortexed for 5 minutes, at which point the mixing was interrupted to scrape the sides with a Pasteur pipette. The tube was subsequently vortexed for 10 additional minutes. For a 30 mL sample, the tube was first vortexed for 10 minutes, at which point the mixing was interrupted to scrape the sides with a Pasteur pipette. The tube was subsequently vortexed for 15 additional minutes. After the vortexing was completed, the tube was placed in a centrifuge (IEC PR-7000M, International Equipment Company, Needham Heights, Mass.) and spun at 100 G for 1.5 minutes to help release air bubbles. The tube was then left undisturbed for a period of time not exceeding 24 hours. Before the shear-thinning composition was used, the tube was centrifuged as needed at 100 G for 1.5 minutes.

In the formulations set forth in Table 4, the pearlescent pigments (EM Industries, Inc., Hawthorne, N.Y.; and Rona business unit of EM Industries) had been sieved in the laboratory and were from the 5–15 micron cut (see Example 4). The graphite flake was Micro790 (Asbury Graphite Mills, Asbury, N.J.) which had been processed by Hosokawa Micron Powder Systems (Summit, N.J.) to an average diameter of 7.8 microns (std. dev.=3.7 microns) with about 0.1% by volume greater than 20 microns and about 2% by volume less than 2 microns. The lubricious particles were Microslip 519 micronized polytetrafluoroethylene powder (Presperse, Inc., Piscataway, N.J.) with a mean particle size of 5.0–6.0 microns. The shear-thinning additive was xanthan gum (Keltrol CG, Kelco Biopolymers, San Diego, Calif.), the dispersants and wetting agents were Disperbyk D-192 and BYK-345 (BYK-Chemie USA, Wallingford, Conn.) and Emerest 2646 (Cognis Corporation, Cincinnati, Ohio), the preservative was Proxel GXL (19.3% by weight solution in dipropylene glycol and water from Avecia Biocides, Wilmington, Del.), the water-soluble organic solvent was propylene glycol (Fisher Scientific Company, Pittsburgh, Pa.), and the water was deionized water.

TABLE 4

Additional Formulations for Shear-Thinning Pearlescent Writing Compositions

| Sample | Color | Pigment Type | Pigment | Xanthan Gum | Microslip 519 | Disperbyk -192 | BYK -345 | Emerest 2646 | Proxel GXL | Propylene Glycol | Water |
|---|---|---|---|---|---|---|---|---|---|---|---|
| A | Red | Afflair 9525 | 13.0 | 0.55 | 6.5 | 0.50 | 0.50 | 0.50 | 0.05 | 18.0 | 60.40 |
| B | Red | Afflair 9525 | 13.0 | 0.55 | 3.0 | 0.50 | 0.50 | 0.50 | 0.05 | 18.0 | 63.90 |
| C | Red | Afflair 9525 | 13.0 | 0.50 | 6.5 | 0.50 | 0.50 | 0.50 | 0.05 | 18.0 | 60.45 |
| D | Red | Afflair 9525 | 13.0 | 0.50 | 3.0 | 0.50 | 0.50 | 0.50 | 0.05 | 18.0 | 63.95 |
| E | Gold | Afflair 9323 | 13.0 | 0.50 | 6.5 | 0.50 | 0.50 | 0.50 | 0.05 | 18.0 | 60.45 |
| F | Gold | Afflair 9323 | 13.0 | 0.50 | 3.0 | 0.50 | 0.50 | 0.50 | 0.05 | 18.0 | 63.95 |
| G | Gold | Afflair 9323 | 13.0 | 0.45 | 6.5 | 0.50 | 0.50 | 0.50 | 0.05 | 18.0 | 60.50 |
| H | Gold | Afflair 9323 | 13.0 | 0.45 | 3.0 | 0.50 | 0.50 | 0.50 | 0.05 | 18.0 | 64.00 |
| I | Blue | Colorona Dark Blue | 13.0 | 0.55 | 6.5 | 0.50 | 0.50 | 0.50 | 0.05 | 18.0 | 60.40 |
| J | Blue | Colorona Dark Blue | 13.0 | 0.50 | 6.5 | 0.50 | 0.50 | 0.50 | 0.05 | 18.0 | 60.45 |
| K | Blue | Colorona Dark Blue | 13.0 | 0.50 | 3.0 | 0.50 | 0.50 | 0.50 | 0.05 | 18.0 | 63.95 |
| L | Blue | Colorona Dark Blue | 13.0 | 0.45 | 6.5 | 0.50 | 0.50 | 0.50 | 0.05 | 18.0 | 60.50 |
| M | Green | Dichrona BG | 13.0 | 0.45 | 5.0 | 0.50 | 0.50 | 0.50 | 0.05 | 18.0 | 58.00 |
|  |  | Graphite M790 | 4.0 |  |  |  |  |  |  |  |  |
| N | Green | Dichrona BG | 13.0 | 0.45 | 5.0 | 0.50 | 0.50 | 0.50 | 0.05 | 18.0 | 59.00 |
|  |  | Graphite M790 | 3.0 |  |  |  |  |  |  |  |  |
| O | Green | Dichrona BG | 13.0 | 0.40 | 5.0 | 0.50 | 0.50 | 0.50 | 0.05 | 18.0 | 58.05 |
|  |  | Graphite M790 | 4.0 |  |  |  |  |  |  |  |  |
| P | Green | Dichrona BG | 13.0 | 0.40 | 5.0 | 0.50 | 0.50 | 0.50 | 0.05 | 18.0 | 59.05 |
|  |  | Graphite M790 | 3.0 |  |  |  |  |  |  |  |  |

EXAMPLE 3

Power Law Parameters for Shear-Thinning Pearlescent Inks

The apparent viscosity ($\mu$) of each sample was determined at 25° C. with a Carri-Med CSL$^2$-500 Rheometer (TA Instruments, New Castle, Del.). The instrument used a cone-and-plate geometry with a stainless steel cone having a 4-cm diameter and a 2-degree angle. A small amount of sample (0.7 mL) was sheared within a 69 micron gap at a shear rate ($\gamma$) ramping between 0.05 and 1000 sec$^{-1}$ in 3 minutes. The shear stress ($\tau$) was determined from the torque required to drive the cone, and the apparent viscosity was calculated from $\mu=\tau/\gamma$ where $\mu$ is in units of Pa sec, $\tau$ is in N·m$^{-2}$, and $\gamma$ is in sec$^{-1}$.

For each sample, the measured viscosities were fit to the shear rates using the two parameter Ostwald-de Waele or power law model $\mu=K\gamma^{n-1}$ where n is the flow behavior index (or a shear-thinning index when n<1) and K is the power law coefficient (kg·m$^{-1}$·sec$^{n-2}$). The power law model provides a good fit for shear-thinning fluids (n<1) at intermediate shear rates over a a range of one to two orders of magnitude. The model does not describe viscosity well at very low or very high shear rates.

After examination of the data for the samples of Table 4, the power law model was fit to the viscosities between shear rates of 1.0 sec$^{-1}$ and 100 sec$^{-1}$. The resulting values of K and n are given in Table 5, together with the calculated values of apparent viscosity for shear rates of 1.0 sec$^{-1}$, 30 sec$^{-1}$, and 100 sec$^{-1}$. R-squared values were better than 0.99 for all regressions set forth in Table 5.

TABLE 5

Power Law Parameters for Shear-Thinning Pearlescent Writing Compositions

| Sample | Color | K Power Law Coefficient (kg · m$^{-1}$ · s$^{n-2}$) | n Shear-Thinning Index | Viscosity (mPa · s) 1.0 s$^{-1}$ | 30 s$^{-1}$ | 100 s$^{-1}$ |
|---|---|---|---|---|---|---|
| A | Red | 5.11 | 0.188 | 5,110 | 322 | 121 |
| B | Red | 4.93 | 0.172 | 4,930 | 295 | 109 |
| C | Red | 5.02 | 0.179 | 5,020 | 307 | 114 |
| D | Red | 4.60 | 0.173 | 4,600 | 277 | 102 |
| E | Gold | 6.73 | 0.154 | 6,730 | 379 | 137 |
| F | Gold | 6.21 | 0.141 | 6,210 | 335 | 119 |
| G | Gold | 5.98 | 0.154 | 5,980 | 336 | 121 |
| H | Gold | 5.76 | 0.141 | 5,760 | 310 | 110 |
| I | Blue | 7.93 | 0.143 | 7,930 | 430 | 153 |
| J | Blue | 7.35 | 0.137 | 7,350 | 391 | 138 |
| K | Blue | 4.32 | 0.226 | 4,320 | 311 | 122 |
| L | Blue | 6.53 | 0.140 | 6,530 | 351 | 125 |
| M | Green | 7.58 | 0.170 | 7,580 | 451 | 166 |
| N | Green | 7.31 | 0.162 | 7,310 | 423 | 154 |
| O | Green | 6.57 | 0.181 | 6,570 | 406 | 151 |
| P | Green | 6.06 | 0.177 | 6,060 | 369 | 137 |

EXAMPLE 4

Particle Sizes of Pearlescent Pigments Before and After Sieving

Writing compositions were formulated according to Table 4 with pearlescent pigments obtained directly from the vendor (EM Industries, Inc., Hawthorne, N.Y., and Rona business unit of EM Industries). Pen refills were made with the compositions using commercial 1-mm stainless steel points for metallic gel inks. About 1 mL of each sample was added by syringe to the open end of a refill tube closed by the point at the other end. A plug of grease (44-21-A, National Ink, Inc., Santee, Calif.) was added on top of the sample. The resulting refill was centrifuged at 300 G for 1.5 minutes prior to use.

The red and the gold compositions wrote relatively smooth with few instances of skipping. The refills continued to write beyond the first day. The blue and the green compositions wrote with a very gritty feeling and with an inconsistent line quality. The refills stopped writing by the next day. Literature from the vendor indicated that the particle size distributions for the red and the gold pigments (5–25 microns) were smaller than for the blue and the green pigments (10–60 microns).

All vendor pigments were then sieved using a GilSonic Autosiever Model GA-6 with 5-, 15-, and 20-micron sieves (Gilson Company, Inc., Lewis Center, Ohio). The pigment particles remaining between the 5- and 15-micron sieves were used to remake the formulations. Refills were fabricated and evaluated with these compositions. In all cases, the writing quality was found to be about the same or slightly improved for the red and the gold compositions and very much improved for the blue and the green compositions. Writing was smooth and consistent with all compositions, and refills continued to write beyond the first day.

Samples of the writing compositions with vendor and sieved pigments were prepared for observation by optical microscope under transmitted light at a magnification of 400× (Eclipse ME600, Nikon Corporation, Japan). The images were characterized by image analysis (Optimas Version 6.5, Media Cybernetics, Silver Spring, Md.), and the results are summarized in Table 6. Sample names ending with "A" are from the vendor, and sample names ending with "B" are sieved.

Overall, the red and the gold pigments have the smallest average diameters, with little change before and after sieving. The average particle diameters fall between about 7 microns and 8 microns, with a standard deviation of about 4 microns. Less than about 0.4% of the particles are larger than 20 microns. The average aspect ratio (major axis/breadth) is about 1.6, with a range from 1 to 6.

The blue and the green pigments are much larger particles than the red and the gold pigments and show a significant change with sieving. The vendor samples (3A and 4A) have average particle diameters between 13 microns and 18 microns, with a standard deviation of about 10 microns. About 24% or more of the particles are larger than 20 microns. The worse case is the blue pigment, which has 39% of the particles greater than 20 microns and a maximum diameter of about 80 microns. In addition, the blue pigment has some particles with an aspect ratio approaching 11.

After sieving, the average particle diameters of the blue and the green pigments (3B and 4B) are reduced to between about 10 microns and 12 microns, with a standard deviation of about 6 microns. Also, 13% or less of the particles are greater than 20 microns, and the largest observed particles are about 30 microns for both pigments. The aspect ratios are about the same as for the red and the gold pigments.

These image analysis results on the particle sizes help to provide constraints for the pigment size distributions which will allow pearlescent pigments to flow fairly smoothly through a conventional metallic gel point. Preferably, the average diameter is between about 1 micron and about 25 microns; more preferably, the average diameter is between about 2 microns and about 15 microns; and most preferably, the average diameter is between about 3 microns and about 12 microns. Typically, more than 75% of the pearlescent particles have a diameter between 2 microns and 20 microns; more preferably, more than 85% of the pearlescent particles have a diameter between 2 microns and 20 microns; most preferably, more than 90% of the pearlescent particles have a diameter between 2 microns and 20 microns. A typical aspect ratio is between 1 and about 12; preferably, between 1 and about 7; and most preferably, between 1 and about 2.

TABLE 6

Image Analysis Results for Particle Sizes of Pearlescent Pigments

| | | Pigment | | Number Particles Counted | Diameter | | | Cumulative Percentage | | | Aspect Ratio | | |
|---|---|---|---|---|---|---|---|---|---|---|---|---|---|
| Sample | Color | Type | Condition | | Avg $\mu$ | Std Dev $\mu$ | Max $\mu$ | ≤2.0 $\mu$ | >15 $\mu$ | >20 $\mu$ | Avg | Min | Max |
| 1A | Red | Afflair 9525 | Vendor 5–25$\mu$ | 1,228 | 8.0 | 4.1 | 24.1 | 6.3 | 4.7 | 0.4 | 1.6 | 1.0 | 6.0 |
| 1B | Red | Afflair 9525 | Sieved 5–15$\mu$ | 1,168 | 8.3 | 3.5 | 19.8 | 3.3 | 3.8 | 0 | 1.6 | 1.0 | 4.6 |
| 2A | Gold | Afflair 9323 | Vendor 5–25$\mu$ | 627 | 7.5 | 3.6 | 21.3 | 5.4 | 2.6 | 0.3 | 1.5 | 1.0 | 4.6 |
| 2B | Gold | Afflair 9323 | Sieved 5–15$\mu$ | 1,421 | 7.1 | 3.5 | 21.7 | 5.4 | 2.6 | 0.3 | 1.5 | 1.0 | 4.2 |
| 3A | Blue | Colorona Dark Blue | Vendor 10–60$\mu$ | 561 | 17.7 | 10.4 | 81.0 | 4.6 | 59.0 | 38.9 | 1.6 | 1.0 | 10.6 |
| 3B | Blue | Colorona Dark Blue | Sieved 5–15$\mu$ | 979 | 10.6 | 5.9 | 33.3 | 7.4 | 24.4 | 5.8 | 1.6 | 1.0 | 4.9 |
| 4A | Green | Dichrona BG | Vendor 10–60$\mu$ | 575 | 13.7 | 10.2 | 72.8 | 8.9 | 43.5 | 24.0 | 1.5 | 1.0 | 5.3 |
| 4B | Green | Dichrona BG | Sieved 5–15$\mu$ | 342 | 12.2 | 6.9 | 33.0 | 9.9 | 36.3 | 13.2 | 1.6 | 1.0 | 6.8 |

EXAMPLE 5

Effect of Particle Sizes on Luster and Erasability of Pearlescent Inks

A quantity of red pearlescent pigment from the vendor (Afflair 9525, EM Industries, Inc., Hawthorne, N.Y.) was sent to Nisshin Engineering Inc., Ltd. (Tokyo, Japan), for milling and air classification. Nisshin completed two different trials with the pigment and characterized the particle size distributions before and after processing with the Microtrac X-100 analyzer (Microtrac Inc., Montgomeryville, Pa.). The results of this analysis are shown in Table 7, where Sample 1A represents the pigment from the vendor, and Sample 1C and Sample 1D represent the pigments from the two processing trials.

Writing compositions similar to the formulation of Sample A in Table 4 were made from the processed pigments and the vendor pigment. Pen refills were produced according to the procedure in Example 4. Several lines of text were manually written with each refill, and a section of line was manually erased with a Pink Pearl eraser (Sanford Corporation, Bellwood, Ill.) after waiting about 15 seconds from the time of writing. The luster and the erasability of the text were evaluated for each writing composition using subjective scales. For luster, the scale was: 1=no shine, 2=poor shine, 3=acceptable shine, 4=good shine, and 5=very good shine, where shine refers to a satiny shine and not a glittery shine. For erasability, the scale was: 1=very poor, 2=poor, 3=acceptable, 4=good, and 5=very good. The values for luster and erasability are also included in Table 7.

The results in Table 7 indicate that the processed samples have much smaller particles than the original sample. The number average diameter, Avg (n), for the vendor pigment (Sample 1A) is 8.7 microns, in good agreement with the value of 8.0 microns in Table 6 by image analysis. From the number average diameters of the processed pigments, Sample 1C is lower at 3.8 microns, and Sample 1D is much lower at 0.1 micron. The other values in the table from the particle size analyzer are based on volume; for example, Avg (v) is the volume average diameter.

Although additional samples with a gradual shift in size distributions between Sample 1A and Sample 1C would be necessary for rigorous conclusions, some general observations can be made about the luster and the erasability of pearlescent writing compositions. As expected from the literature, the shininess of the pearlescent writing composition is controlled by the larger particles. However, for text to have an acceptable shine, there must be sufficient quantity of particles larger than 10 microns, and at least more than about 1% by volume larger than about 15 microns. For a very good shine, more than about 22% by volume should be greater than about 15 microns. The erasability of the pearlescent writing composition is controlled by the smaller particles. An acceptable erasability appears to have less than about 1% by volume less than about 2 microns. For very good erasability, less than about 1% by volume should be less than about 5 microns.

TABLE 7

Effect of Pearlescent Particle Size Distribution on Luster and Erasability of Writing Compositions

| | | | | Diameter | | | Volume % | | | | | | |
|---|---|---|---|---|---|---|---|---|---|---|---|---|---|
| Sample | Color | Pigment Type | Condition | Avg (n) $\mu$ | Avg (n) $\mu$ | Std Dev $\mu$ | <2.0 $\mu$ | <3.0 $\mu$ | <5.0 $\mu$ | ≥10.1 $\mu$ | ≥15.6 $\mu$ | Luster Rating | Erase Rating |
| 1A | Red | Afflair 9525 | Vendor | 8.7 | 12.7 | 4.3 | 0.0 | 0.0 | 0.8 | 67.4 | 22.3 | 4 | 5 |
| 1C | Red | Afflair 9525 | Nisshin | 3.8 | 6.0 | 2.3 | 0.3 | 7.1 | 40.1 | 6.1 | 0.3 | 2 | 3 |

TABLE 7-continued

Effect of Pearlescent Particle Size Distribution on Luster and Erasability of Writing Compositions

| Sample | Color | Pigment Type | Condition | Diameter Avg (n) μ | Avg (n) μ | Std Dev μ | Volume % <2.0 μ | <3.0 μ | <5.0 μ | ≥10.1 μ | ≥15.6 μ | Luster Rating | Erase Rating |
|---|---|---|---|---|---|---|---|---|---|---|---|---|---|
| 1D | Red | Afflair 9525 | Nisshin | 0.1 | 3.6 | 1.7 | 16.6 | 35.6 | 78.6 | 0.2 | 0.0 | 1 | 2 |

EXAMPLE 6

Stability of Pearlescent Inks

Table 8 summarizes the physical properties of selected writing compositions which were made according to the formulations in Table 4. The procedures for measuring percentage solids, pH, surface tension, and viscosity are described at the end of this example. Sample J* represents a variation of Sample J in which the pearlescent pigment was pretreated with a cationic polymer (Disperbyk-185, BYK-Chemie USA, Wallingford, Conn.), washed, and dried before being used in the formulation.

TABLE 8

Physical Properties of Pearlescent Writing Compositions

| Sample | Color | % Solids | pH | Surface Tension (mN/m) | Viscosity at 30 s$^{-1}$ (mPa · s) |
|---|---|---|---|---|---|
| A | Red | 21.4 | 6.8 | 30.3 | 306 |
| E | Gold | 21.7 | 7.1 | 31.2 | 363 |
| J | Blue | 20.9 | 5.3 | 29.7 | 362 |
| J* | Blue | 21.0 | 7.3 | — | 315 |
| O | Green | 23.8 | 6.9 | — | 402 |
| P | Green | 22.7 | 6.9 | 29.3 | 354 |

The stability of the formulations in Table 8 was evaluated by centrifuging at 500 G for three minutes and by heating at 50° C. for four weeks. The two procedures are described in more detail at the end of this example. Although the thermal test is used as the final determination of stability, the centrifugation test was an attempt to speed up the evaluations so that changes could be made at a faster rate. For each method, two values are recorded in Table 9: (1) the presence of an interface in the vial of fluid, and (2) the change in the percentage solids at the bottom of the vial.

The thermal results indicate that the red and the gold formulations (Samples A and E) are very stable, showing no visible separations and having less than 4% increase in solids. Pen refills containing these formulations and previously subjected to the same thermal conditions continued to write in an acceptable manner after treatment. Even though the red formulation (Sample A) shows a 38% increase in solids after centrifuging, these conditions are apparently more extreme than the thermal test.

For the blue formulation (Sample J), the results so far are not as positive. Although the change in solids after centrifuging is 41%, slightly above the value for the red formulation, the change in solids from the thermal test after only two weeks is on the high side at 5.5%. Because Sample J is the most acidic composition of all the formulations in Table 8, the pigment for Sample J* was treated so that the formulation would have a more basic pH. The subsequent results from centrifugation show a very small change in solids and suggest that this formulation will have good thermal stability.

The results from centrifuging the green formulations (Samples O and P) predict unstable compositions, with Sample P being worse than sample O. The change in solids is between about 50% and 82%, and diffuse interfaces are apparent in both samples. As expected, the thermal results are negative, with a clear layer appearing at the surface of Sample P after two weeks and at the surface of Sample O after three weeks.

The values in Tables 8 and 9 were determined by the following procedures:

% Solids. The percentage solids was measured by depositing 0.1 mL of sample into a tared 44-mL aluminum dish on a balance pan. The initial weight (wo) was recorded. The pan was placed in an oven at 50° C. overnight, and the final weight (wf) was recorded the next day. The percentage solids was calculated as % Solids=(wf/wo)*100

The reported value was an average of four measurements.

pH. The pH was measured using an Accumet pH/conductivity meter (Model 20, Fisher Scientific Company, Pittsburgh, Pa.) with a pH indicating electrode (AccuTupH, Fisher Scientific Company, Pittsburgh, Pa.).

Surface tension. Surface tension was determined with a Cahn Dynamic Contact Angle Analyzer (DCA-312, Thermo Orion, Beverly, Mass.) using the DuNouy ring method. The force of break-point was determined with a 5.925-cm circumference platinum-iridium ring drawn through the surface of a 5-mL sample in a 35 mm×10 mm petri dish. Three measurements were taken on each sample and then averaged for the reported surface tension.

Viscosity. Viscosity was measured as described in Example 3. The experimental value at 30 s-1 is given in Table 8 for comparison of the compositions.

Thermal stability. A volume of fluid was pipetted into a 13 mm×100 mm glass tube to a height of 5.0 cm. The vial was capped and then secured with Teflon tape around the gap between the cap and the tube. Three vials were prepared for each formulation and placed upright in a water bath at 50° C. A vial from each formulation was removed from the bath after two, three, and four weeks. The appearance of the fluid in the vial was noted, and the location of an interface (sharp or diffuse) was determined as a percentage of the fluid height, where all heights were measured from the bottom of the vial. Quantities of fluid (0.1 mL) were then sampled at 0% (bottom), 25% and 75% of the fluid height. These samples were used to determine percentage solids. The values were compared with the original values at the start of the test. The change in solids at the bottom of the vial was reported in Table 9.

Centrifugation stability. A volume of fluid was pipetted into a 13 mm×100 mm glass tube to a height of 5.0 cm. The vial was capped and centrifuged at 500 G for 3 minutes. The vial was removed from the centrifuge and examined for visual changes in the fluid. The presence of an interface (sharp or diffuse) was recorded as a percentage of the fluid height, where all heights were measured from the bottom of the vial. The vial was then opened, and three samples (0.1 mL) were taken at 0% (bottom), 25%, and 75% of the fluid height. The percentage solids of each sample was determined and compared with the original value before centrifugation. The change in solids at the bottom of the vial was reported in Table 9.

Laydown (used in Example 7). The laydown of refills was measured using a Hutt Testwriter HST-10 (Rudi Hutt, Germany). The writing machine was set to run at 4.5 m/min for the circular motion of the writing plate, 200 mm/min for the paper feed, and a slow speed (1 rpm) for the refill rotation. Each refill was angled at 60 degrees and placed under a 50-g load in addition to the pen holder (about 64 g). The paper was Nekoosa Bond. The refills were weighed at the start (wo) and at the end (wf) of each writing distance (d). The laydown (L) for each segment was calculated as $$L=(wo-wf)/d$$

Two 20-m writing segments were completed with each refill, and the reported laydown was the average of the segments.

During the test, four sets of four pens were used, with the order of the colors varied in each set. With twelve panelists in the test, each set was eventually used by three individuals. The subjects wrote with each pen on a five-minute exercise which included writing six sentences and drawing two lines. One of the sentences was erased immediately after completing (about 5 to 10 seconds), and a second sentence was erased after about 2 to 3 minutes. A Pink Pearl eraser (Sanford Corporation, Bellwood, Ill.) was used for all erasures. The tracings and erasures were analyzed by image analysis.

The image analysis system consisted of a light table with 250 W photoflood lamps (Wiko, Orland Park, Ill.), a Sony DCR-VX1000 digital video camera recorder (Sony Corporation, Japan), and Optimas Version 6.5 software (Media Cybernetics, Silver Spring, Md.). For the erasability measurements, the 24-bit RGB images were analyzed directly; for the line width and intensity measurements, the colored images were converted to 8-bit grayscale images.

The line width of a product was calculated from the measured values of area and perimeter for the detected tracings using the equation $$\text{Line Width}=(2*\text{Area})/([\text{Perimeter}]^2-4*\text{Area})^{0.5}$$

The results were averaged for two sentences and two lines for each subject and then averaged across all panelists.

The intensity of a product was measured as the average gray value of the detected tracings (black=0; white=255).

TABLE 9

Stability of Pearlescent Writing Compositions

| | | Centrifugation Stability 500 G for 3 min | | 2 weeks | | Thermal Stability at 50° C. 3 weeks | | 4 weeks | |
|---|---|---|---|---|---|---|---|---|---|
| Sample | Color | Interface | % Change | Interface | % Change | Interface | % Change | Interface | % Change |
| A | Red | None | 38.3 | None | 1.0 | None | 3.8 | None | 3.9 |
| E | Gold | None | 0.6 | None | 0.2 | None | −0.5 | — | — |
| J | Blue | None | 41.0 | None | 5.5 | — | — | — | — |
| J* | Blue | None | 2.2 | — | — | — | — | — | — |
| O | Green | Diffuse interface at 15% ht | 49.6 | None | 3.2 | Clear layer; interface at 98% ht | 8.2 | — | — |
| P | Green | Diffuse interface at 15% ht | 81.8 | Clear layer; interface at 96% ht | 3.6 | — | — | — | — |

EXAMPLE 7

Line Width, Intensity, and Erasability Values For Pearlescent Inks

An internal panel test was run with twelve subjects (6 men/6 women) using a set of four pens containing red, gold, blue, and green writing compositions. These compositions were made according to selected formulations in Table 4. Red was Sample A, gold was Sample F with Microslip 519L (mean particle size 11.0–13.0 microns) in place of Microslip 519, blue was Sample J, and green was Sample P. The pens were constructed with recycled bodies and points from commercial metallic gel pens having 1-mm points. A refill containing the writing composition was inserted into each pen body. Four refills of each color were characterized by laydown measurements before the start of the test, and the average values are listed in Table 10 for reference (see Example 6 for the laydown procedure).

The percent intensity of the writing with an average gray value of z was then calculated as $$\%\text{ Intensity}=(1-[z/255])*100$$

Similar to the procedure for line width, results were averaged for two sentences and two lines for each subject and then averaged across all panelists.

The erasability of a product was defined as the ability to recover the gray level reading of the blank paper by removing the written tracings with an eraser. The percent erasability was calculated as $$\%\text{ Erasability}=(z/z_o)*100$$

where z is the average gray value of the erased section and $z_o$ is the average gray value of the blank section of paper. For each panelist, erasability was determined for the immediate "5–10 seconds" erasing example and for the longer "2–3 minutes" erasing example. A blank paper region was measured before and after each erasing region, and the average of these blank regions was used to divide the measurement for the erasing region.

The calculated values for line width, intensity, and erasability are tabulated in Table 10 for the red, gold, blue, and green writing compositions. The results show that some improvement in erasability can be achieved by lowering the laydown of the writing composition; however, the laydown cannot be so low that the intensity and the line width are unacceptable. The results also show that the erasability of the writing composition improves after waiting a small amount of time before erasing. Although this specific test had more than 2 minutes of elapsed time, subsequent tests have shown that 15 to 20 seconds is probably the minimum time needed with writing compositions having laydowns in the range of 7 to 9 mg/m.

Typically, for the intensity of pearlescent writing compositions, the preferred value is greater than 25%, the more preferred value is greater than 30%, and the most preferred value is greater than 40%.

For the erasability of pearlescent writing compositions, the preferred value is greater than 80%, the more preferred value is greater than 90%, and the most preferred value is greater than 95%.

For the laydown of pearlescent writing compositions, the preferred value is between 0.1 mg/m and 15 mg/m, the more preferred value is between 1 mg/m and 12 mg/m, and the most preferred value is between 5 mg/m and 10 mg/m.

TABLE 10

Image Analysis Results for Line Width, Intensity, and Erasability of Pearlescent Writing Compositions Using Pens with 1-mm Points

| Sample | Color | Laydown mg/m | Line Width (mm) | | % Intensity | | % Erasability | |
|---|---|---|---|---|---|---|---|---|
| | | | Sentences | Lines | Sentences | Lines | 5–10 sec | 2–3 min |
| A | Red | 8.4 | 0.67 | 0.51 | 48.3 | 55.6 | 95.0 | 98.0 |
| F | Gold | 6.8 | 0.54 | 0.39 | 42.3 | 45.4 | 98.3 | 99.4 |
| J | Blue | 8.4 | 0.67 | 0.48 | 46.1 | 50.8 | 94.0 | 97.4 |
| P | Green | 9.1 | 0.72 | 0.55 | 47.7 | 54.3 | 93.8 | 96.8 |

Other embodiments are within the scope of the following claims. For example, the inks may further include pearlescent pigment particles, e.g., amorphous pearlescent pigment, flake natural pearlescent pigment, primary synthetic pearlescent pigment, and secondary synthetic pearlescent pigment. Examples of suitable pearlescent pigment particles include, but are not limited to, those sold under the tradenames, M-750 and M-250, available from Asbury Carbons, Asbury, N.J.

Moreover, while it is preferred that the ink be shear-thinning and erasable, in some embodiments the ink is not shear-thinning and/or not erasable.

What is claimed is:

1. A pearlescent ink for use in a writing instrument, comprising:
   lubricious particles,
   a shear-thinning additive, and
   pearlescent pigment particles dispersed in a solvent.

2. The ink of claim 1 wherein said solvent comprises an aqueous solvent system.

3. The ink of claim 2 wherein the aqueous solvent system comprises at least one water-soluble organic solvent.

4. The ink of claim 2 wherein the aqueous solvent system comprises at least one water-soluble organic solvent selected from the group consisting of glycols, polyhydric alcohols, glycol ethers, glycol ether esters, amines, amides, and alkanolamides.

5. The ink of claim 1 wherein said ink has a shear thinning index of between about 0.01 and about 0.8.

6. The ink of claim 1, wherein the ink has a viscosity between 200 mPa·sec and 20,000 mPa·sec at a shear rate of about 1.0 sec$^{-1}$, and a viscosity between 10 mPa·sec and 1000 mPa·sec at a shear rate of about 100 sec$^{-1}$.

7. The ink of claim 1 wherein said ink has an erasability of at least about 80%.

8. The ink of claim 1 wherein said ink has a line intensity of at least about 25%.

9. The ink of claim 1 wherein said pearlescent pigment has an average particle diameter between about 1 micron and about 25 microns.

10. The ink of claim 1 further comprising a film-forming agent.

11. The ink of claim 1 further comprising a second pearlescent pigment.

12. The ink of claim 1 further comprising a non-pearlescent pigment.

13. The ink of claim 1 wherein said pearlescent pigment comprises a dichromatic pigment.

14. The ink of claim 1 wherein the shear-thinning additive is a clay, an organoclay, a water-dispersible gum, an acrylic acid-based polymer, or a combination thereof.

15. The ink of claim 1 wherein the pearlescent pigment is selected from the group consisting of natural pearl essence, bismuth oxychloride, and mica flakes coated with metal oxides.

16. The ink of claim 1 wherein the pearlescent pigment comprises mica flakes coated with a layer of metal oxide wherein the metal oxide layer is between about 40 nanometers and about 160 nanometers thick.

17. The ink of claim 1 wherein the lubricious particles comprise polymeric particles selected from the group consisting of polytetrafluoroethylene, polyethylene, polypropylene, polymethylmethacrylate, nylon, modified polyethylene, modified polyamide, and various blends of these materials.

18. The ink of claim 1 wherein the lubricious particles have an average particle diameter between about 0.1 micron and about 30 microns.

19. An erasable pearlescent ink, comprising lubricious particles and a dispersion of a pearlescent pigment in a solvent, the ink exhibiting an erasability of at least 80%.

20. The ink of claim 19 wherein the pearlescent pigment consists essentially of particles having a diameter between about 1 micron and about 25 microns.

21. The ink of claim 19 wherein said solvent comprises an aqueous solvent system.

22. The ink of claim 19 wherein said ink has a shear thinning index of between about 0.01 and about 0.8.

23. The ink of claim 19 wherein said ink exhibits an erasability of at least about 90%.

24. The ink of claim 19 wherein said ink exhibits a line intensity of at least about 30%.

25. The ink of claim 19 wherein said ink is substantially free of dye.

26. The ink of claim 19 further comprising a second pearlescent pigment.

27. The ink of claim 19 further comprising a non-pearlescent pigment.

28. The ink of claim 19 wherein said pearlescent pigment comprises a dichromatic pigment.

29. The ink of claim 19 wherein the lubricious particles comprise polymeric particles selected from the group consisting of polytetrafluoroethylene, polyethylene, polypropylene, polymethylmethacrylate, nylon, modified polyethylene, modified polyamide, and various blends of these materials.

30. The ink of claim 19 wherein the lubricious particles have an average particle diameter between about 0.1 micron and about 30 microns.

31. A shear-thinning pearlescent ink, comprising:

lubricious particles;

a pearlescent pigment;

a solvent; and, a shear-thinning additive, wherein said pigment is dispersed in said solvent has a shear-thinning index of between about 0.01 and about 0.8.

32. A method of forming a marking on a substrate, comprising:

making a marking on the substrate with a writing instrument containing a pearlescent ink comprising lubricious particles, a shear-thinning additive, and pearlescent pigment particles dispersed in a solvent.

33. A method of forming a marking on a substrate, comprising:

making a marking on the substrate with a writing instrument containing a pearlescent ink comprising lubricious particles and a dispersion of a pearlescent pigment in a solvent, the ink exhibiting an erasability of at least about 80%.

34. A method of forming a marking on a substrate, comprising:

making a marking on the substrate with a writing instrument containing a pearlescent ink comprising lubricious particles, a solvent, a shear-thinning additive, and a pearlescent pigment, wherein said pigment has an average particle diameter between about 1 micron and about 25 microns and is dispersed in said solvent.

35. A method of forming a marking on a substrate, comprising:

making a marking on the substrate with a writing instrument containing a pearlescent ink comprising lubricious particles, a pearlescent pigment, a solvent, and a shear-thinning additive, wherein said pigment is dispersed in said solvent and the ink has a shear-thinning index of between about 0.01 and about 0.8.

36. A writing instrument, comprising:

a reservoir containing a pearlescent ink comprising lubricious particles, a shear-thinning additive, and pearlescent pigment particles dispersed in a solvent.

37. A writing instrument, comprising:

a reservoir containing a pearlescent ink comprising lubricious particles and a dispersion of a pearlescent pigment in a solvent, the ink exhibiting an erasability of at least about 80%.

38. A writing instrument, comprising:

a reservoir containing a pearlescent ink comprising lubricious particles, a solvent, a shear-thinning additive, and a pearlescent pigment wherein said pigment has an average particle diameter between about 1 micron and about 25 microns and is dispersed in said solvent.

39. A writing instrument, comprising:

a reservoir containing a pearlescent ink comprising lubricious particles, a pearlescent pigment, a solvent, and a shear-thinning additive, wherein said pigment is dispersed in said solvent, and the ink has a shear-thinning index of between about 0.01 and about 0.8.

* * * * *